(12) United States Patent
Ferguson et al.

(10) Patent No.: US 11,146,925 B2
(45) Date of Patent: Oct. 12, 2021

(54) LOCATION SYSTEM

(71) Applicant: Arm Limited, Cambridge (GB)

(72) Inventors: Peter James Samuel Ferguson, Cambridge (GB); Andrew Dunn, Cambridge (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 265 days.

(21) Appl. No.: 16/519,913

(22) Filed: Jul. 23, 2019

(65) Prior Publication Data
US 2021/0029521 A1    Jan. 28, 2021

(51) Int. Cl.
*H04W 16/20* (2009.01)
*H04W 4/33* (2018.01)
*H04W 4/024* (2018.01)

(52) U.S. Cl.
CPC ........... *H04W 4/33* (2018.02); *H04W 4/024* (2018.02)

(58) Field of Classification Search
CPC .......... H04W 4/33; H04W 4/024; G01S 1/08; G01S 3/14; H04N 2201/3253; G06F 15/173
See application file for complete search history.

(56) References Cited

U.S. PATENT DOCUMENTS

| | | | |
|---|---|---|---|
| 8,138,911 B2* | 3/2012 | Collins | G08B 27/001 340/539.1 |
| 8,159,342 B1* | 4/2012 | Medina, III | G07C 9/28 340/539.32 |
| 10,045,152 B2* | 8/2018 | Chowdhury | H04M 1/72457 |
| 2003/0151506 A1* | 8/2003 | Luccketti | G01S 5/0036 340/539.13 |
| 2007/0067434 A1* | 3/2007 | Bahl | H04L 29/06 709/223 |

(Continued)

OTHER PUBLICATIONS

Mirowski et al., "SignalSLAM: Simultaneous Localization and Mapping with Mixed WiFi, Bluetooth, LTE and Magnetic Signals", Bell Laboratories, Alcatel-Lucent, 600 Mountain Avenue, Murray Hill, NJ 07974, USA.

(Continued)

*Primary Examiner* — Munear T Akki
(74) *Attorney, Agent, or Firm* — EIP US LLP

(57) ABSTRACT

The present disclosure provides a system and method for locating terminals within a facility. One or more of a plurality of primary terminals send a location signal which may comprise location data for the respective primary terminal. A secondary terminal, of a plurality of secondary terminals may receive one or more of these location signals. In response, the secondary terminal sends a confirmation message to each primary terminal from which it has received a location signal. The confirmation message may comprise a unique identifier for the secondary terminal. In response to receiving one or more confirmation messages, a primary terminal sends a location reporting message to a location processing server. The location reporting message comprises the location data for that primary terminal and the contents of the received confirmation message(s). The data held on the location processing server can be used to determine the location and movement of each of the primary terminals and the secondary terminals.

16 Claims, 6 Drawing Sheets

(56) References Cited

U.S. PATENT DOCUMENTS

| | | | | |
|---|---|---|---|---|
| 2012/0176491 | A1* | 7/2012 | Garin | G01S 19/49 |
| | | | | 348/113 |
| 2013/0141233 | A1* | 6/2013 | Jacobs | G16H 50/20 |
| | | | | 340/521 |
| 2015/0312774 | A1* | 10/2015 | Lau | H04W 24/10 |
| | | | | 455/446 |
| 2016/0356876 | A1* | 12/2016 | Lazik | G01S 5/18 |
| 2019/0281573 | A1* | 9/2019 | Tyagi | G01S 5/021 |
| 2021/0123768 | A1* | 4/2021 | Rezvani | G05D 1/101 |

OTHER PUBLICATIONS

Zhou et al., "A Robust Crowdsourcing-Based Indoor Localization System", Sensors 2017, 17, 864, MDPI, Basel, Switzerland.
Wu et al., "Smartphones based Crowdsourcing for Indoor Localization", Transactions on Mobile Computing, vol. X, No. X, Nov. 2013.
https://www.amazon.co.uk/Tracker-Dooreemee-Tracking-Portable-Vehicles/dp/B07ML31WGN/ref=sr_1_17_sspa.
https://www.amazon.co.uk/Chipolo-Plus-GPS-Tracker-Coral/dp/B01MQPLQS9/ref=sr_1_11.
https://www.nrshealthcare.co.uk/health-aids-personal-care/dementia-memory-aids/monitors-reminders-prompts.
http://www.sensewhere.com/solutions/indoor-positioning-system/.
Issoufaly et al., "Crowd Localization: Threats and Solutions", 2017 Global Information Infrastructure and Networking Symposium (GIIS).

* cited by examiner

LOCATION SYSTEM

BACKGROUND OF THE INVENTION

Field of the Invention

This disclosure relates to a method of and system for determining location and in particular to a method of and system for determining location when inside buildings or facilities.

Description of the Related Technology

It is well known to use satellite-based systems to provide location and navigational services. However, such services do not work inside buildings as it is not possible to receive the satellite signals. Some proposed solutions to the problem of location within buildings have been proposed but require the installation of beacons to provide navigational signals or for site surveys to be undertaken.

SUMMARY

According to a first aspect of the present disclosure there is provided a system comprising a primary terminal and a plurality of secondary terminals,
  wherein the primary terminal is configured to determine location data by performing simultaneous localization and mapping, SLAM, and to send location signals such that the location signals can be received by any of the plurality of secondary terminals when in range of the primary terminal,
  wherein at least a secondary terminal of the plurality of secondary terminals is configured to send a confirmation message to the primary terminal when it receives a location signal from the primary terminal, the confirmation message comprising a secondary terminal identifier, and
  wherein the primary terminal is configured to send a location reporting message to a location processing server, the location reporting message comprising data relating to the determined location data and data relating to the confirmation message sent by the secondary terminal.

At least a further secondary terminal of the plurality of secondary terminals may be configured to determine a location of the secondary terminal in accordance with the location signal received from the primary terminal. The further secondary terminal may be configured to send a location reporting message to the location processing server, the message comprising the determined location of the further secondary terminal.

According to a second aspect of the present disclosure there is provided a primary terminal comprising an imaging sensor, a processor, and a memory, the memory storing facility map data, the primary terminal being configured to:
  compare data received from the imaging sensor with facility map data;
  determine location data for the primary terminal within the facility in accordance with the comparison;
  send a location signal; and
  receive one or more confirmation messages from one or more of a plurality of secondary terminals, the or each confirmation message being sent in response to receiving the location signal.

The primary terminal may be further configured to send a location reporting message to a location processing server, the message comprising the location data and the one or more confirmation messages received from one or more of the plurality of secondary terminals. Alternatively, or in addition, the primary terminal may be configured to send a message to a location processing server if no confirmation messages are received from the plurality of secondary terminals within a reporting period, the message sent to the location processing server comprising the location data.

According to a third aspect of the present disclosure there is provided a method of determining the location of secondary terminals within a facility, the method comprising:
  a) one or more of a plurality of primary terminals determining location data by performing simultaneous localization and mapping, SLAM, and sending location signals to one or more of a plurality of secondary terminals; and
  b) determining the location of the one or more secondary terminals in accordance with one or more of the location signals received by the one or more secondary terminals from the plurality of primary terminals.

DETAILED DESCRIPTION OF CERTAIN INVENTIVE EMBODIMENTS

Figure 1:
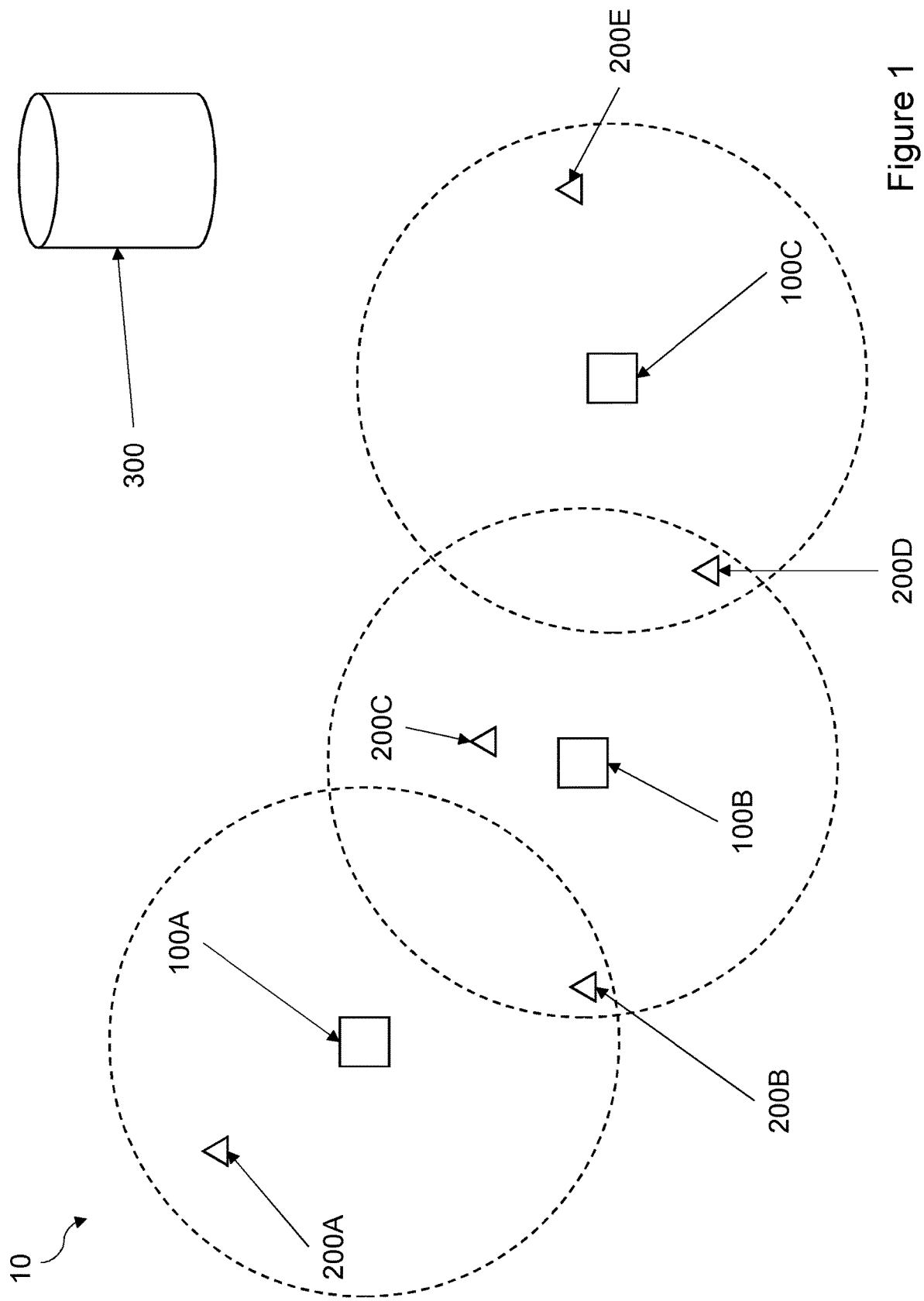
FIG. 1 shows a schematic depiction of a system according to the present disclosure.

FIG. 1 shows a schematic depiction of a system 10 according to the present disclosure. The system comprises a plurality of primary terminals 100 and a plurality of secondary terminals 200 which are within a facility such as a building or a complex of buildings (for the sake of clarity, the facility is not shown in FIG. 1). Each of the plurality of primary terminals 100 is able to determine location data to a high degree of accuracy, for example to within 10 cm, within a building or an internal facility. Periodically, each of the plurality of primary terminals will send a location signal which comprises the most recently determined terminal location data. Each of the plurality of secondary terminals 200 may not have the functionality to determine location data and thus can use the location signals that are received from one or more of the plurality of primary terminals 100 to determine their location. FIG. 1 shows primary terminals 100A, 100B, 100C and secondary terminals 200A, 200B, ..., 200E. The dotted circles centered upon each of the primary terminals indicate the range of the location signal sent by the respective primary terminal. It can be seen from FIG. 1 that secondary terminal 200A can only receive a location signal from primary terminal 100A, and that similarly secondary terminals 200C & 200E can only receive a location signal from primary terminals 100B and 100C respectively. Secondary terminals 200B and 200D can receive location signals from two of the primary terminals.

Each of the plurality of secondary terminals may, in response to receiving a location signal from a primary terminal, send a confirmation message to that primary terminal. This confirmation message can be received by the primary terminal and indicates that the secondary terminal is in range of the location signal from that primary terminal. The confirmation message may comprise an identifier for that secondary terminal. A secondary terminal may send a confirmation message for each of the location signal(s) which are received. Additionally, or in an alternative, a secondary terminal may determine location data based on the location signal, or location signals, received from one or more of the plurality of primary terminals.

Each of the plurality of primary terminals may report their location data in the form of location reporting messages sent to a location processing server 300. Furthermore, each of the plurality of primary terminals may report to the location processing server data content from the confirmation message(s) which were received from the one or more secondary terminals in response to the location signal sent by the primary terminal. The location processing server may hold a list of the plurality of primary terminals and their respective location data, which has been determined to a high degree of accuracy, and a list of the plurality of secondary terminals and their respective location data, which has been determined in accordance with the one or more location signals which have been received by the respective secondary terminal. In the case that a secondary terminal determines location data based on one or more received location signals, then the secondary terminal may report that location data independently to the location processing server.

It should be appreciated that the accuracy of the location determination made by a secondary terminal will increase with the number of location signals which are received by that secondary terminal from respective primary terminals. It should be appreciated that FIG. 1 shows a simplified view of a system according to the present disclosure and in practice it is likely that will be a large number of both primary and secondary terminals. Furthermore, some or all of the primary and secondary terminals may be mobile such that their position with respect to the other terminals is likely to change with time such that the number of location signals that a secondary terminal receives may vary. Thus, the accuracy of the location data obtained for each of the secondary terminals may vary with the number of location signals that are received from a primary terminal.

Figure 2:
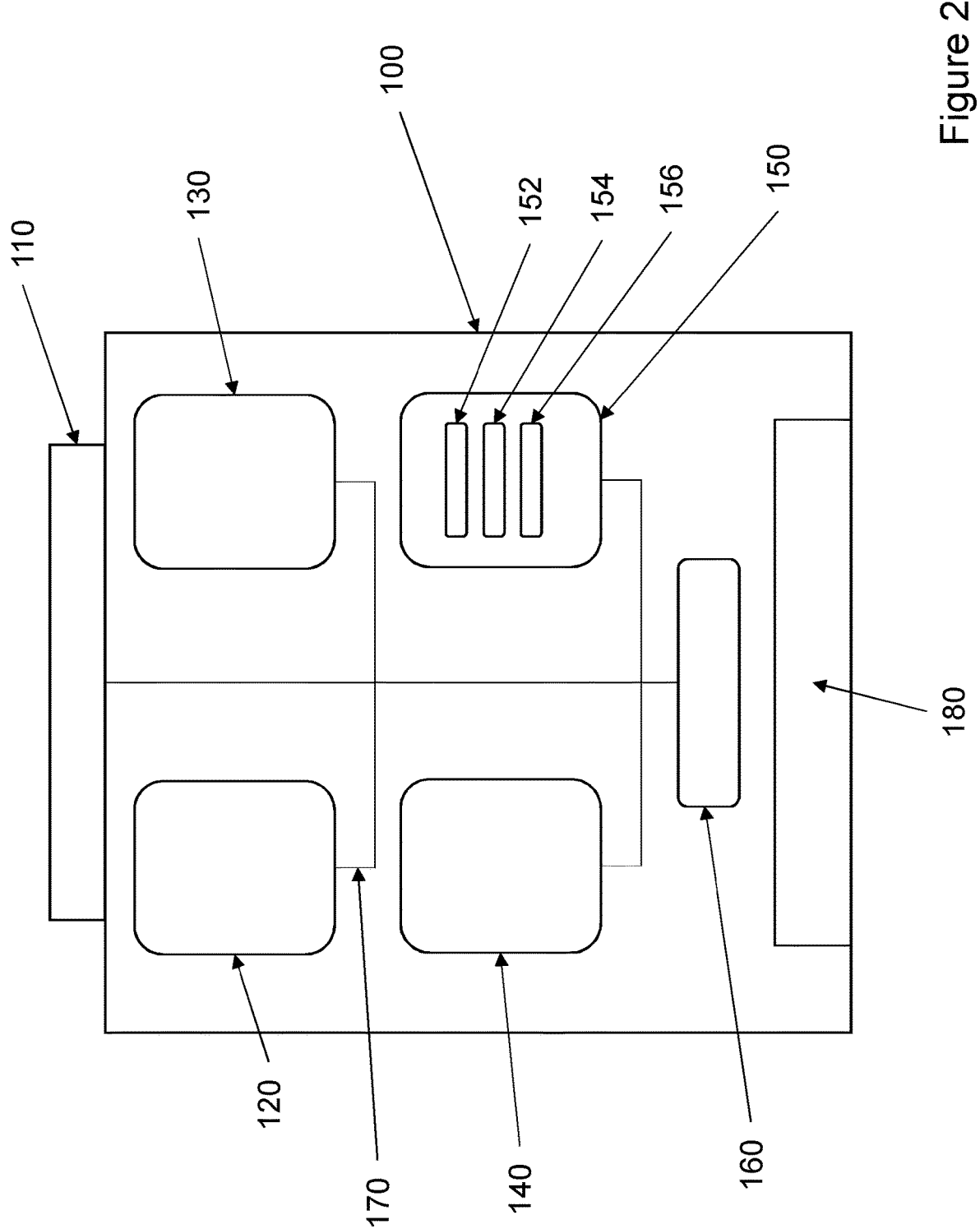
FIG. 2 shows a schematic depiction of a primary terminal.

FIG. 2 shows a schematic depiction of a primary terminal 100. The primary terminal 100 may comprise a network interface 110, a processor 120, memory 130, an imaging sensor 140, non-volatile data storage 150 and one or more location sensors 160. The network interface 110, processor 120, memory 130, imaging sensor 140, non-volatile data storage 150 and one or more location sensors 160 are interconnected by a communications bus 170. The primary terminal also comprises a power supply 180. The non-volatile data storage 150 comprises a location application 152 and one or more further applications or computer software programs 154, 156 which may be required for the operation of the primary terminal.

In use, the location application 152 may be written to memory 130 and executed by the processor 120. The location application may comprise a map of the facility and the imaging sensor can be activated to generate an image of the location of the primary terminal within the facility. This image, will show, for example, how far from the walls the terminal is, the location of doors, windows, other features, etc. Data from the one or more location sensors, which may comprise one or more of a compass, an accelerometer, a gyroscope, etc. can be combined with the information from the imaging sensor and the map data held within the location application to determine the location of the primary terminal within the facility. This method is known as simultaneous localization and mapping (SLAM). The combination of the map data and the data from the imaging sensor and the one or more location sensors enables location data for the primary terminal to be determined with a high degree of accuracy.

The location data can be then be sent in a location signal via the network interface 110. The primary terminal waits for a reporting period, which may be a predetermined period of time, to receive confirmation messages from any of the plurality of secondary terminals which may have received the location signal. After the reporting period has expired then the primary terminal sends its location data and data relating to any received confirmation messages to the location processing server 300. This determination of the location data for the primary terminal is performed periodically such that for each of the plurality of primary terminals the location processing server holds a sequence of location data which allows the progress of the primary terminal through the facility to be tracked. Furthermore, with each reporting of location data by a primary terminal, the primary terminal reports which of the plurality of secondary terminals responded to the location signal. The location data relating to the secondary terminals can be processed such that location data for each one of the plurality of secondary terminals can be separated from the location data reported by each of the primary terminals and then combined such that the position and the progress of each of the secondary terminals can be recorded by the location processing server.

The network interface 110 may be configured to send and receive wireless signals of different types and having different formats. For example, a wireless LAN or cellular network interface (such as, for example, IEEE 802.11 a/b/g/n, LTE, 5G etc.) may be used to send and receive data from the location processing server 300. A further network interface may be used to send the location signal, for example Bluetooth or Bluetooth Low Energy (LE). It should be understood that a primary terminal may be implemented by downloading an app to a smartphone, tablet or other mobile computing device such that the app provides the functionality of the location application 152.

Figure 3:
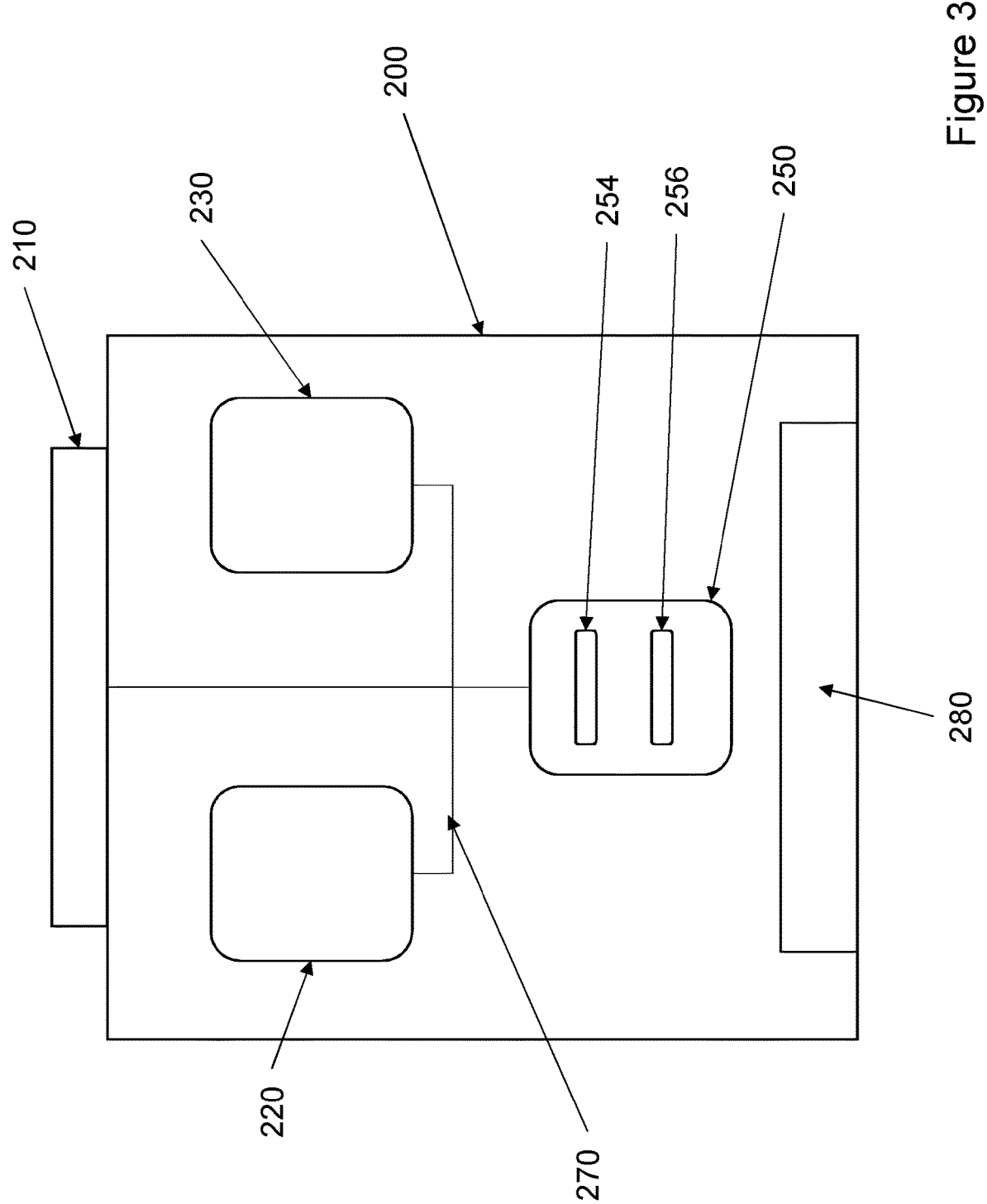
FIG. 3 shows a schematic depiction of a secondary terminal.

FIG. 3 shows a schematic depiction of a secondary terminal 200. The secondary terminal 200 comprises a network interface 210, processor 220, memory 230 and non-volatile data storage 250. The network interface 210, processor 220, memory 230, and the non-volatile data storage 250 are interconnected by a communications bus 270. The secondary terminal also comprises a power supply 280. The non-volatile data storage 250 comprises one or more applications or computer software programs 254, 256 which may be required for the operation of the secondary terminal.

In use, when a location signal from a primary terminal is received by the secondary terminal, the secondary terminal may send a confirmation message in response. The confirmation message may comprise an identifier for the secondary terminal such that the position and progress of the secondary terminal may be determined. The network interface may be configured such that it can receive the location signal sent by a primary terminal and then send the appropriate confirmation message back to the primary terminal, for example, using a Bluetooth LE signal. It can be seen from the above discussion with relation to FIG. 3 that a secondary terminal may also be implemented on a smart phone, tablet or other mobile computing device with the downloading of an appropriate app. In such a case, the secondary terminal may determine its own location data in response to receiving one or more location signals from one or more of the primary terminals. Furthermore, the secondary terminal may report the location data which it determines to the location processing server via the network interface, which may comprise a wireless LAN or cellular network interface (such as, for example, IEEE 802.11 a/b/g/n, LTE, 5G etc.).

Figure 4:
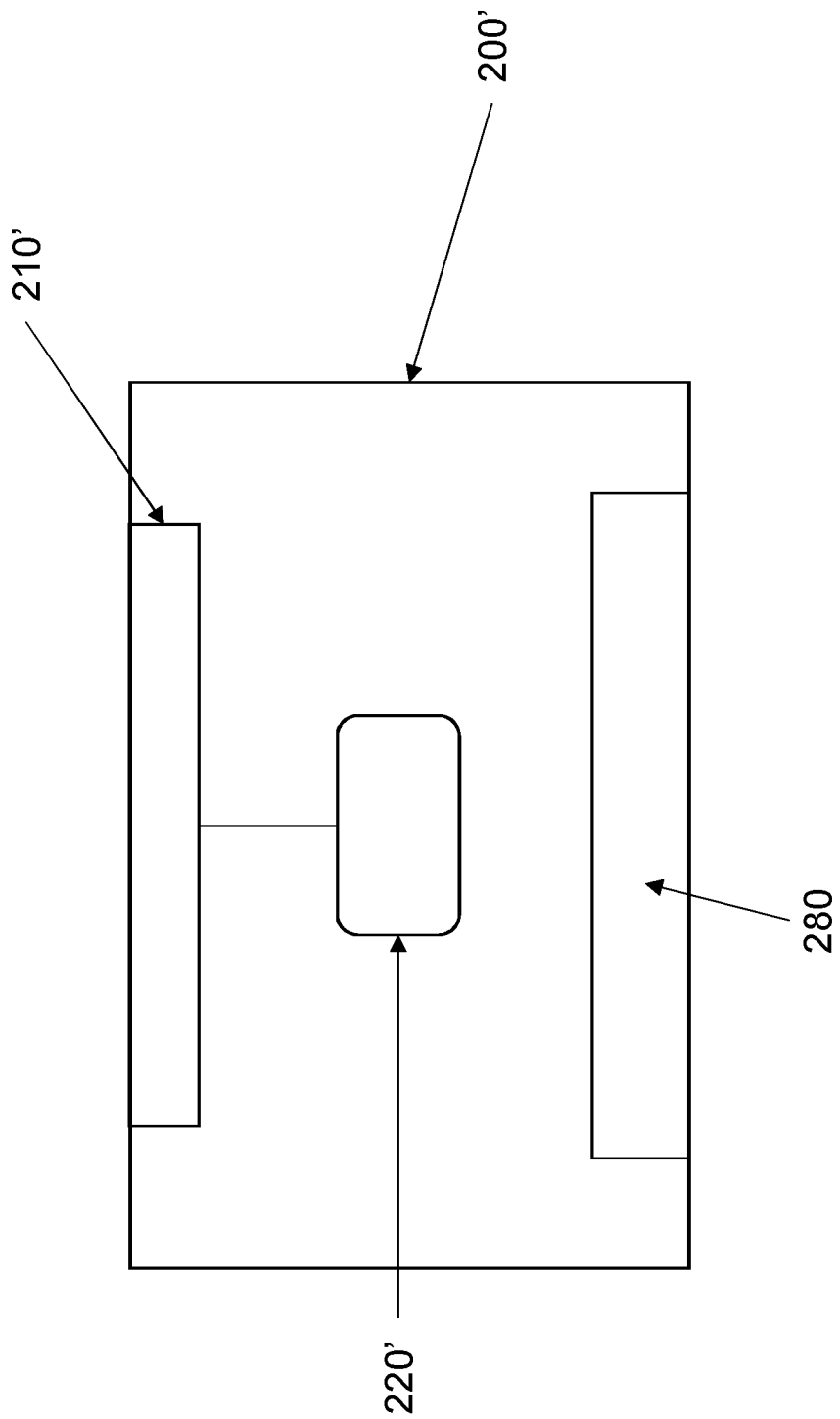
FIG. 4 shows a schematic depiction of an alternative embodiment of a secondary terminal.

FIG. 4 shows a schematic depiction of an alternative embodiment of a secondary terminal 200' in which the secondary terminal 200' comprises an antenna 210' and a processor 220'. The secondary terminal may comprise a battery 280. In use, a location signal from a primary terminal is received at the antenna 210' and is coupled to the processor 220'. The processor 220' is configured to generate a confirmation message when a location signal is received at the antenna 210' and to then send the confirmation message via the antenna. The confirmation message may comprise an identifier for the secondary terminal. The identifier may be globally unique, or may be unique within the local facility. Depending on the format of the location signal, the confirmation message and the transmission protocol that is required to receive and send the respective signals, it may be possible that the secondary terminal 200' can be a passive device. That is, the electrical power received from the location signal may be sufficient to power the secondary terminal. In the event that that is not possible then a battery 280 may be provided to power the antenna 210' and the processor 220'. It should be understood that the alternative embodiment of the secondary terminal 200' may be incorporated into another device such as, for example, a photocard, key card, or other credential token that can be associated with an individual, or an asset tag which can be applied to a device or piece of apparatus which is of value or significance.

Figure 5:
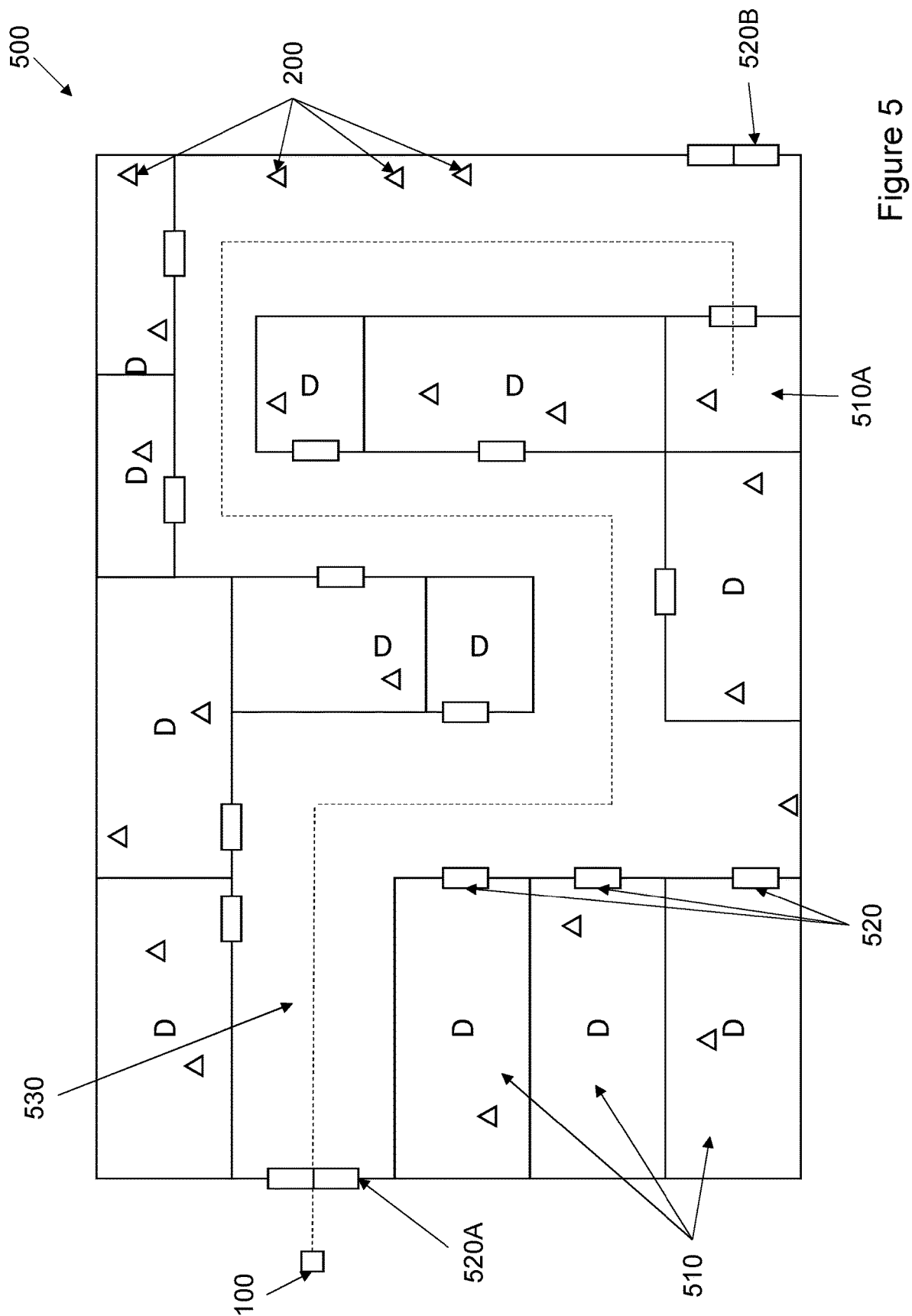
FIG. 5 shows a schematic depiction of a part of a facility in which a system according to the present disclosure may be deployed.

FIG. 5 shows a schematic depiction of a part of a facility 500 in which a system according to the present disclosure may be deployed. In the following discussion the facility is a hospital but is should be understood that this should not be seen as a limitation to the present system, which could be deployed in a wide range of different facilities. FIG. 5 shows a corridor 530 which extends between doors 520A and 520B. The facility may comprise a plurality of different rooms 510, with doors 520 separating the rooms from the corridor. Primary terminal 100 is a smartphone associated with a patient who has an appointment in room 510A. FIG. 5 shows the route that the user takes to room 510A by a dashed line.

A location application has been downloaded onto the smartphone which contains map data for the hospital facility and provides the SLAM functionality. Once the location application is activated then the primary terminal will determine its location within the facility and will then guide the patient to room 510A. The phone camera can be used as the imaging sensor and data from the camera, the location sensor(s) and the map data held in the location application can be used to determine location data for the primary terminal.

The primary terminal may also function as an augmented reality device by displaying to the user the output of the camera on the screen of the smartphone and superimposing visual indicators to show the user the route to the appointment. For example, the primary terminal may display a line on the floor such that if the user follows the line then they will be guided to the appointment location. Alternatively, the primary terminal may display arrows, or other visual indicators, to show the user which direction to take at corridor junctions or intersections. In addition to these visual indicators, or as an alternative, the primary terminal may provide audible guidance to the user such that they follow the route to the location of the appointment.

It will be understood that whilst the user is walking along the corridor 530 to room 510A, the primary terminal periodically determines its location data, as described above. Each time the primary terminal determines location data the primary terminal may send a location signal. In response, the primary terminal may receive a confirmation message from each of the secondary terminals 200 which receive the location signal. The primary terminal may then send its location data and data relating to the received confirmation message to the location processing server (not shown in FIG. 5), as discussed above.

Further to the above discussion with relation to FIG. 3, the secondary terminal may comprise a smartphone which is running a background process. The background smartphone process executed by the secondary terminal receives the location signal and then sends a confirmation message in response. The secondary terminal may also generate its own location data in response to receiving a location signal from a primary terminal, and then send that location data to the location processing server. This allows the location and the movement of the secondary terminal, which can be associated with an employee, to be monitored.

Alternatively, the secondary terminal may be similar to the embodiment of the secondary terminal shown in FIG. 4 and may be incorporated in, for example, a photocard. The secondary terminal receives the location signal and in response sends a confirmation message. The primary terminal may wait for a reporting period to elapse and then sends its location data along with data from the or each confirmation message which have been received from one or more secondary terminals to the location processing server; or if no confirmation messages have been received in the reporting period, sends its location data without any accompanying data from confirmation messages (assuming any previously-received confirmation messages have already been reported).

The primary terminal may periodically determine location data and send location signals as it moves along the corridor. As the primary terminal moves, some of the secondary terminals no longer receive the location signals from that primary terminal whereas other secondary terminals are now within the range of the location signals and thus their location is recorded on the location processing server. Although FIG. 5 shows a single primary terminal in the facility it should be understood that in a hospital it is likely that many patients will be moving to or from an appointment and may have a smartphone which is operating as a primary terminal.

A primary terminal may also take the form of the apparatus described above with reference to FIG. 3 integrated into a piece of equipment, for example a powered bed or a trolley which includes electrically powered equipment such as a defibrillator. In the case of the primary terminal being integrated into powered equipment such as a powered bed, the primary terminal apparatus may comprise a battery 280 which is able to power the primary terminal when the equipment is being moved within the hospital and is not connected to a power supply. Once the bed is re-connected to a power supply then the battery may be recharged.

Asset tags, barcodes, or other identifying means may incorporate a secondary terminal as discussed above in relation with to FIG. 4. These secondary terminals may be attached to assets, equipment, or other items which are likely to be moved within the hospital but which may need to be located and retrieved in an emergency.

By integrating primary terminal functionality into a piece of equipment, as described, the primary terminal may periodically send location signals and the primary terminal may report the location of the equipment to the location processing server, along with the identity of any secondary terminals which are within the range of the location signals and send a confirmation message. Furthermore, as the equipment is moved within the hospital the location of the equipment can be updated at the location processing server and the location of further secondary terminals can be determined and stored in the location processing server.

Figure 6:
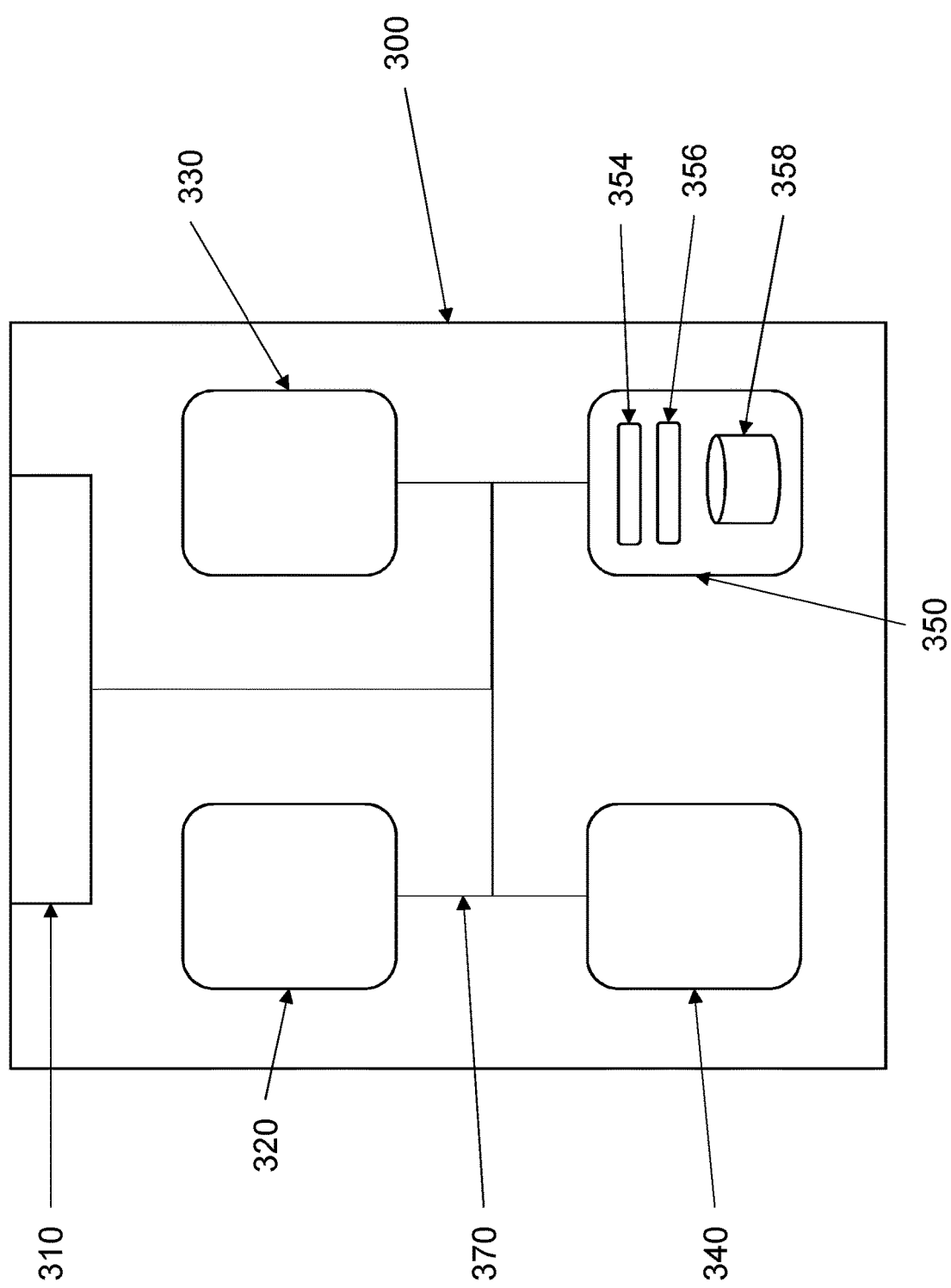
FIG. 6 shows a schematic depiction of a location processing server.

FIG. 6 shows a schematic depiction of the location processing server 300. The primary terminal 300 comprises a network interface 310, processor 320, memory 330 and non-volatile data storage 350, which are interconnected by a communications bus 370. The primary terminal also comprises a power supply 180. The non-volatile data storage 350 comprises one or more applications or computer software programs 354, 356 which may be required for the operation of the primary terminal and location database 358. When a primary terminal sends location data to the location processing server the location data may be stored in the SLAM-location database 358. The location data may be stored such that the location and the progress of primary terminals or secondary terminals within the facility can be tracked. For the primary terminals which correspond to patient smartphones, the location data may be processed such that it is not possible to identify the patient. Furthermore, since the location data derived from a patient's smartphone is likely to be of limited value once it has been confirmed that the patient attended the appointment so that data may be periodically deleted from the location database.

Storage of data retrieved from primary terminals integrated into hospital equipment and from secondary terminals is likely to be of greater value and therefore deleted less frequently, or stored permanently. Consider that staff members may have a secondary terminal integrated into a pass card or other credential token which is used when working. A system according to the present disclosure enables the location of the secondary terminal, and thus the employee, to be recorded at each time that the secondary terminal sends a confirmation message in response to receiving a location signal from a primary terminal. This allows the location of the employee to be determined throughout the duration of their working day. This data can be used when drawing up work rosters, ensuring that sufficient staff are assigned to each department, infection control, etc. Similarly, if a specific individual is required then it is possible to search the location database to determine the most recent location recorded for that individual. It may also be possible to infer their destination based on a sequence of recent locations and the direction in which that they are moving.

Equipment into which a primary terminal has been integrated may be reporting location data periodically. Thus, if equipment of a particular type, for example a defibrillator machine, is needed in an emergency then it would be possible for the location database to be queried and for the location of all of the defibrillators to be displayed such that a defibrillator may be accessed. For equipment to which a secondary terminal has been attached, the location database will hold the most recent location which was determined for that item of equipment. It should be understood that this can be used to locate equipment as it is needed, to perform checks on inventory, etc.

It should be understood that a location system according to the present disclosure may be deployed without the addition of any additional infrastructure. Communication between a primary terminal and a secondary terminal may be limited to a certain proximity range and may be based on a short-range radio technology, for example using Bluetooth, Bluetooth LE or a similar transmission technology or use other proximity-limited communications such as near field communication (NFC). The terminals may be arranged to communicate as an ad-hoc mesh network. The reporting of location data to the location processing server, for example by a primary terminal, may use an existing cellular or wireless LAN. There is no need to deploy beacons or base stations which are used by a terminal to determine its location. The SLAM functionality can be built into the operating system of the primary terminals, or built into the location application. In either case, the location application is SLAM-enabled. Location signals may be transmitted under the control of a SLAM-enabled location application provided for the primary terminals. It should be understood that such a location application could be re-used for different facilities with different maps being provided for each facility. It should be understood that SLAM may provide both location and mapping functionality and thus if facilities are modified or extended then it may be possible for the SLAM-enabled location application executed by a primary terminal to send mapping data updates to the location processing server such that facility maps can be updated to reflect the changes that are made to the facility. Some form of incentive may be provided to encourage potential users to download and use the location application which provides the primary terminal functionality. This may comprise a 'gamification' function which provides rewards or other incentives for using the location application.

Although the foregoing description of the use of a system according to the present disclosure has been made with reference to a hospital, it should be understood that such a system could equally be applicable for use in other facilities such as airports, railway stations, convention centers, etc., in which it is likely that there will be a need for a group of users to use a SLAM-based to navigate within the facility (that is, to constitute a plurality of primary terminals) and that there may be employees and/or assets which can be better managed or utilized if there was accurate information relating to their location (that is, the location of the employees and/or assets could be monitored through the use of secondary terminals).

Although at least some aspects of the embodiments described herein with reference to the drawings comprise computer processes performed in processing systems or processors, the disclosure also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the disclosure. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

What is claimed is:

1. A system comprising a primary terminal and a plurality of secondary terminals,
wherein the primary terminal is configured to determine location data for the primary terminal by performing simultaneous localization and mapping, SLAM, and to send signals that are received by any of the plurality of secondary terminals when in range of the primary terminal,
wherein at least a secondary terminal of the plurality of secondary terminals is configured to send a confirmation message to the primary terminal when it receives at least a signal of the signals from the primary terminal, the confirmation message comprising a secondary terminal identifier, and
wherein the primary terminal is configured to send a location reporting message to a location processing server, the location reporting message comprising data relating to the location data and data relating to the confirmation message sent by the secondary terminal.

2. The system according to claim 1, wherein the signals comprise the location data for the primary terminal.

3. The system of claim 1, wherein the signals comprise proximity-limited communication signals.

4. The system of claim 1, wherein the location reporting message sent to the location processing server comprises one or more secondary terminal identifiers received by the primary terminal.

5. The system of claim 1, wherein at least a further secondary terminal of the plurality of secondary terminals is configured to determine a location of the further secondary terminal in accordance with the signal received from the primary terminal.

6. The system of claim 5, wherein the further secondary terminal is configured to send a further location reporting message to the location processing server, the further location reporting message comprising the location of the further secondary terminal.

7. A primary terminal comprising an imaging sensor, a processor, and a memory, the memory storing facility map data for a facility, the primary terminal being configured to:
compare data received from the imaging sensor with the facility map data;
determine location data for the primary terminal within the facility in accordance with the comparison;
send a signal;
receive one or more confirmation messages from one or more of a plurality of secondary terminals, the or each confirmation message being sent in response to receiving the signal.

8. The primary terminal according to claim 7, wherein the signal includes the location data.

9. The primary terminal of claim 7, wherein the primary terminal is further configured to send a location reporting message to a location processing server,
the location reporting message comprising the location data and data relating to the one or more confirmation messages received from one or more of the plurality of secondary terminals.

10. The primary terminal of claim 9, wherein the primary terminal is further configured to send a location reporting message to the location processing server if no confirmation messages are received from the plurality of secondary terminals within a reporting period, the location reporting message sent to the location processing server comprising the location data.

11. A method of determining a location of secondary terminals within a facility, the method comprising:
a) one or more of a plurality of primary terminals determining location data for the one or more of the plurality of primary terminals, respectively, by performing simultaneous localization and mapping, SLAM, and sending signals to one or more of a plurality of secondary terminals; and
b) determining the location of the one or more secondary terminals in accordance with one or more of the signals received by the one or more secondary terminals from the one or more of the plurality of primary terminals.

12. The method of claim 11, wherein in step b) the one or more secondary terminals which receive the one or more of the signals send one or more confirmation messages to a respective primary terminal of the one or more of the plurality of primary terminals, the one or more confirmation messages comprising a secondary terminal identifier.

13. The method of claim 12, the method further comprising the one or more of the plurality of primary terminals sending location reporting messages to a location processing server, the location reporting messages comprising the location data for the one or more of the plurality of primary terminals and data relating to the one or more confirmation messages received by the respective primary terminal.

14. The method of claim 13, wherein the location reporting messages sent to the location processing server comprise each of one or more secondary terminal identifiers received by the respective primary terminal.

15. The method of claim 11, the method further comprising a secondary terminal of the one or more secondary terminals determining its location in accordance with the signals received from the one or more of the plurality of primary terminals.

16. The method of claim 15, the method further comprising the secondary terminal sending a message to a location processing server, the message comprising the location of the secondary terminal.

* * * * *